Nov. 17, 1959  R. R. OWEN ET AL  2,913,060
MOLDBOARD PLOW WITH PLASTIC RESIN COVERING
Filed Nov. 25, 1957  2 Sheets-Sheet 1
FIG. 1.
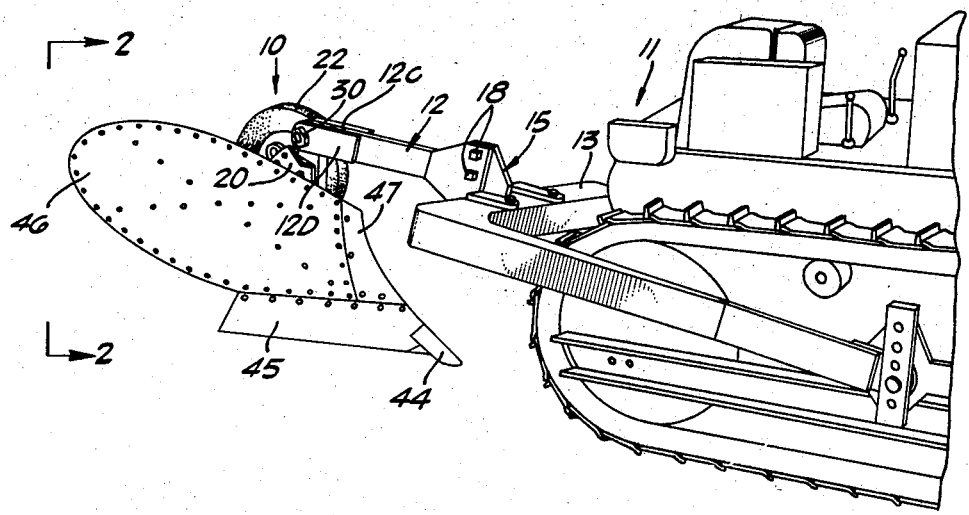
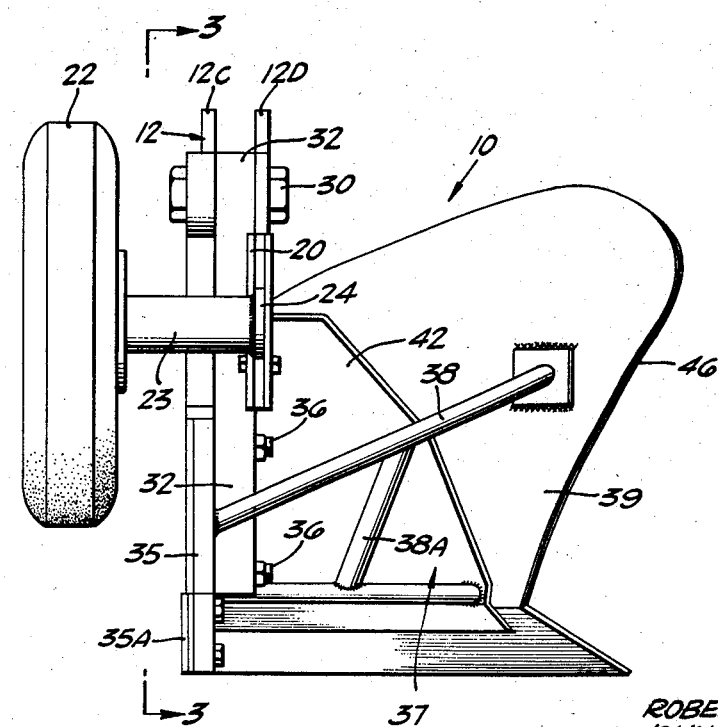
FIG. 2.
ROBERT R. OWEN
JOHN F. CYKLER
ROY T. TRIBBLE
INVENTORS
BY
ATTORNEYS Nov. 17, 1959     R. R. OWEN ET AL     2,913,060
MOLDBOARD PLOW WITH PLASTIC RESIN COVERING
Filed Nov. 25, 1957     2 Sheets-Sheet 2
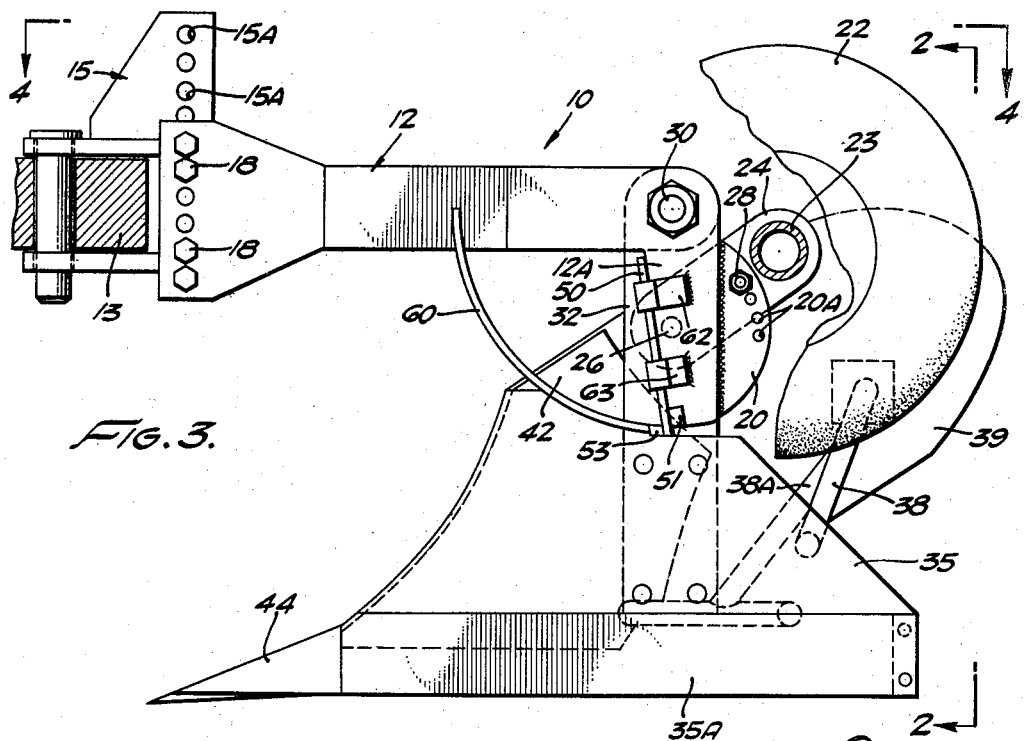
FIG. 3.
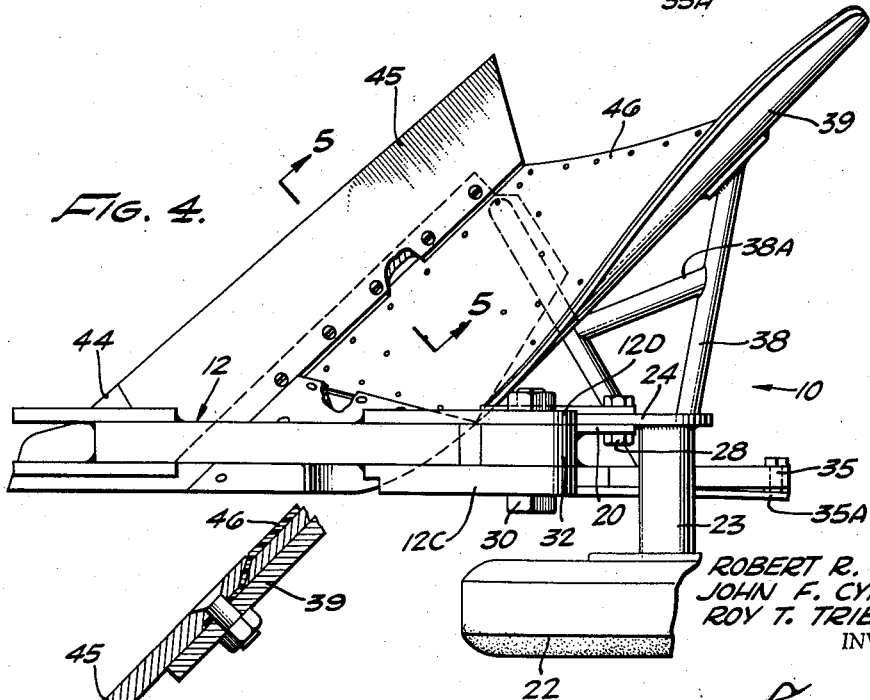
FIG. 4.
FIG. 5.
ROBERT R. OWEN
JOHN F. CYKLER
ROY T. TRIBBLE
INVENTORS
BY *Lyon & Lyon*
ATTORNEYS United States Patent Office 2,913,060
Patented Nov. 17, 1959

2,913,060

MOLDBOARD PLOW WITH PLASTIC RESIN COVERING

Robert R. Owen, Birmingham, Mich., and John F. Cykler and Roy T. Tribble, Honolulu, Hawaii, assignors to Pineapple Research Institute of Hawaii, Honolulu, Hawaii, a Hawaiian association Application November 25, 1957, Serial No. 698,754

7 Claims. (Cl. 172—747)

The present invention relates to plows useful in plowing soils which fail to scour cleanly from tillage equipment and soils which have a heavy cover of vegetative growth, plant residue, or other debris on the surface thereof. Particular application has been made to the non-scouring low humic and humic latosols of Hawaii under pineapple culture.

The scouring point or sticky point (Klebegrenze of Atterberg) represents the moisture content above which soil sticks to a foreign object. The scouring quality of soils is considered to be the result of the adhesive effect of water films which is sufficient to cause the soil to adhere or stick to the surface of the ground working implement. A furrow slice which fails to scour is not properly inverted by passage across the share. Such adhesion also markedly increases the kinetic friction or resistance to passage of the soil over the share. The moisture content at which highly plastic soils fail to scour, the scouring point or sticky point, lies slightly below the upper plastic limit and should be approximately the same as the moisture content at which maximum adhesion occurs. Maximum adhesion for many plastic soils occurs at a moisture content about midway in the plastic range. Also, it is recognized that the force of adhesion of soil to metal is a linear function of the colloid content of the soil.

The humic and low humic latosols are composed of approximately 85% clay separates. Despite the high kaolin clay mineral in this fraction, the soils are moderately to highly plastic, for their plastic index lies between 10 and 20. Soil with a plastic index greater than 15 is considered highly plastic. Moreover, the lower plastic limit of these soils is frequently a moisture content less than the moisture equivalent and the field capacity. As a consequence, these soils often fail to scour cleanly and have a very high coefficient of kinetic friction when at the appropriate moisture content. One of the major design variables of tillage equipment is the composition and polish of the material of the surface applying the force to the soil. Non-wetting material with a low coefficient of friction will insure scour and decrease the kinetic friction across the share. This action will ensure proper inversion of the furrow and decrease the power required to operate the equipment.

The moldboard plow has long been recognized, where scouring conditions exist, as the most efficient plow type known; however, problems are encountered in the use of such moldboard plow, particularly in the pineapple industry in Hawaii which requires a moldboard plow to invert the soil and bury trash in order to prepare the fields properly. Much time and effort has heretofore been expended in developing such a moldboard plow and many different expedients have been tried, as shown and described in U.S. Letters Patent of Arnold B. Skromme, No. 2,689,512, which is assigned to the present assignee. The problems encountered in properly working Hawaiian soils is also explained in such Patent No. 2,689,512.

It has heretofore been considered necessary that the moldboard of the plow be provided with mechanically movable elements, such as belt type conveyors, as shown in such U.S. Letters Patent. Prior attempts have been made to build moldboard plows with movable parts associated with the moldboard and with different materials as wood and rubber but they have not proven successful.

In accordance with the present invention, the construction of a moldboard plow for these purposes is greatly simplified by covering the moldboard with polytetrafluoroethylene resin which is sold under the trademark Teflon. Teflon in sheet form is used to cover a part of the moldboard where scouring difficulties normally occur. Teflon is used in low pressure areas. The shin and share of the plow are high pressure areas, and, therefore, scour and do not require the Teflon covering.

It is, therefore, a general object of the present invention to provide an improved plow for these purposes.

Another object of the present invention is to provide a moldboard plow that has proven successful in plowing non-scouring soils of the type found in Hawaii.

Another object of the present invention is to provide an improved moldboard plow in which no movable parts are associated with the moldboard for purposes of maintaining the moldboard clean of non-scouring soils.

Another object of the present invention is to provide an improved plow which has selected portions thereof covered with a plastic resin that repels water very strongly.

Another object of the present invention is to provide an improved plow constructed so that it may operate in smaller fields, back up to sharp corners and work in rougher terrain and which allows the use of smaller tractors to plow the same depth over the same width at the same tractor speed; or to obtain greater plow depth, additional plow width or greater speed using present tractors.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 is a perspective view showing a plow embodying features of the present invention mounted on a tractor.

Figure 2 is a view taken generally in the direction indicated by the arrows 2—2 in both Figures 1 and 3.

Figure 3 is a sectional view taken along the line 3—3 in Figure 2.

Figure 4 is a top view taken generally in the direction indicated by the arrows 4—4 in Figure 3.

Figure 5 is a sectional view taken along the line 5—5, in Figure 4.

The moldboard plow 10 is pulled by the tractor 11 and has its beam 12 adjustably secured to the conventional U-shaped plow hitch 13. The U frame is lifted hydraulically to clear the ground in the transport position. For these purposes, a clevis type structure 15 is bolted on the hitch frame 13 and has a plurality of vertically spaced holes 15A through which fastening bolts 18 extend for adjustable securing of the plow beam 12 on the hitch 13.

The plow beam 12 has a downwardly extending leg 12A to which is welded an arcuate shaped plate 20 having circumferentially spaced apertured portions 20A therein for the purpose of adjustably supporting the ground engaging or depth control wheel 22. The wheel 22 is rotatably supported on an axle 23 which is welded on an arm 24, such arm 24 being pivotally mounted on the downwardly extending beam portion 12A at 26. The arm 24 is releasably secured to the plate 20 by a bolt 28 which passes through apertured portion 20A in bolt 20 and the apertured portion of arm 24.

The plowing portion of the plow is pivotally mounted on the beam 12 by the axis of the bolt 30 which passes through apertured portions of the spaced beam members 12C and 12D and the plow supporting arm 32. Such arm 32 is normally prevented from pivoting, however, while plowing, by means described later.

The arm 32 at its lower end has bolted thereto the landside plate 35 by means of bolts 36. The "frog" assembly 37 is welded to the landside plate 35 and elements thereof are secured by brace members 38 and 38A. Such "frog" assembly includes the landside plate 35, the wing section 42, moldboard 39 and the plow tip 44. The plowshare 45 comprises a plate which is detachably secured to the "frog" assembly and it, with the plow tip 44, defines the lower portion of the plow.

In accordance with the present invention, at least a portion of the earth engaging side of the moldboard 39, is covered with a strip of Teflon 46 and such Teflon may be secured by conventional fastening means such as bolts. A shin guard 47 should be secured to cover a substantial portion of the upper leading edge of the moldboard when pressures are high. Further, such shin guard may be secured such that it overlaps the upper leading edge of the Teflon strip 46 as to protect and secure the same in position. The term Teflon is used in a generic sense and could include cementable Teflon sheets that are cemented on the moldboard such as, for example, sold under the name of Kalon-T by Shamban Engineering Co., of Culver City, California.

These soils are low in quartz content and are, therefore, slightly abrasive to plastics such as Teflon. Even though it has been found that non-compounded Teflon withstands the abrasive action of Hawaiian soils, it is considered desirable to use Teflon compounded with glass fibres instead of non-compounded Teflon.

Plowing is accomplished at depths of approximately 18" and greater. In order to provide some protection against buried rocks, the plowing portion of the plow is allowed to pivot about the axis of the bolt 30 when an obstruction such as a rock is encountered. Normally, a shear bar 50 having its lower end disposed between shearing anvils 51 and 53 prevents pivotal movement. The anvil 51 forms a part of the beam portion 12A and the anvil 53 is a shoulder on the landside plate 35. As shown in Figure 3, the shear bar 50 is positioned between the anvils 51 and 53 and prevents counterclockwise pivotal movement of the plowing portion of the plow. However, when a large obstruction is encountered, the shear bar 50 is sheared between anvils 51 and 53 and during subsequent pivotal movement of the landside plate 35, the lower cut end of the shear bar 50 bears against the circular shear bar supporting plate 60 which is mounted on the landside plate 35. The shear bar 50 may be moved in its space guides 62 and 63 on the beam portion 12A so that it may slide therein under the influence of gravity force or under the influence of a spring (not shown) when the plowing portion is pivoted back to its normal position, at which time the shear bar 50 is automatically positioned as shown in Figure 3, between the anvils 51 and 53.

While the clevis structure that serves to mount the beam 12 on the tractor hitch 13 affords the same vertical adjustment, more precise adjustment is desirable and this is accomplished by adjusting the position of the wheel axle supporting arm 24 with respect to the apertured plate 20.

It is noted that the landside plate 35 is constructed of mild steel having a thickness of approximately 1½".

Such plate 35 has adjustably secured, on its outer side, a suction controlling plate 35A. Shims of variable thicknesses are interposed between the plates 35 and 35A to adjust the landside suction and direction of pull. The moldboard backing plate 39 may be of sheet material having a thickness of approximately ½" and of mild steel. Physically, the moldboard plate 39 is formed as a generally hyperbolic-paraboloid shape. It is noted also that the detachable plowshare plate 45 overlaps a portion of the leading lower edge of the Teflon sheet 46 so that such plate 45 and the shin guard 47 overlap and firmly secure the leading edges of the Teflon 46 to secure and protect same. As explained before, the plowpoint 44 is an integral part of the "frog" assembly and is not detachable. Using this structure wherein the point of the plow is an integral part of the "frog," a minimum of bracing is required for the wing section.

Thus, it is noted that the plow is designed to penetrate the soil and plow a straight furrow. Its narrow, gentle angle shim is responsible for the soil compression necessary for shear action, while the moldboard lifts the sheared soil on a gentle incline and sets the inverted soil aside. The soil thus inverted buries trash so that the fields are properly prepared. The soil will not adhere to the Teflon on the moldboard and will scour from the moldboard.

The provision of the Teflon coating 46 on the moldboard is of extreme importance in achieving successful operation. Teflon is a soapy feeling plastic and the addition of the same to the moldboard permits the operation of a strandard moldboard plow in Hawaiian soils. Teflon may be characterized chemically as a polymer formed from a monomer having the structure:

where $R_1$, $R_2$, $R_3$, and $R_4$ represent fluorine.

While successful results have been obtained with Teflon and polyethylene, other materials having the same chemical structure, as characterized above, may be used where the $R_1$, $R_2$, $R_3$ and $R_4$ are constituents selected from the group in which $R_1$, $R_2$, $R_3$, and $R_4$ are hydrogen, chlorine, fluorine methyl, and cyanide. Such chemical compounds are, for example, the first, second, third, ninth and twelfth of the compounds listed on pages 82 and 83 and the compound shown on page 98 of the Scientific American of September 1957. These compounds are, namely, polyethylene, polypropylene, polyvinyl chloride, polyvinylidene chloride and polytrifluorochlorethylene.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. A moldboard type plow having a frog section that comprises a landside member, a plow tip integrally formed with said member, a removable share mounted on at the lower portion of said frog section, a removable shin mounted on said frog section at the leading edge of the same, said plow having a moldboard, a layer of polytetrafluoroethylene mounted on said moldboard, said layer being shaped to conform with the surface thereof and secured thereto by having edges thereof overlapped by said share and shin.

2. A moldboard type plow for use in non-scouring soils having at least a portion of its moldboard covered with a layer of a polymer formed from a monomer having the structure

where $R_1$, $R_2$, $R_3$ and $R_4$ are each selected from the group consisting of fluorine, hydrogen, methyl and chlorine, said layer of polymer being shaped to conform to the surface of said moldboard and being secured thereto.

3. A moldboard type plow as set forth in claim 2 in which $R_1$, $R_2$, $R_3$ and $R_4$ are each fluorine.

4. A moldboard plow as set forth in claim 1 in which said member carried an adjustable plate for adjustment of horizontal suction forces developed while plowing.

5. A moldboard plow having at least a portion of its moldboard covered with a layer of a polymer formed from a monomer having the structure

where $R_1$, $R_2$, $R_3$ and $R_4$ are each selected from the group consisting of fluorine, hydrogen, methyl and chlorine, said layer of polymer being shaped to conform to the surface of said moldboard and being secured thereto, and removable means mounted on the leading edges of said moldboard which overlap edges of said layer and compress said edges between the moldboard and said removable means to secure and protect the same.

6. A plow as set forth in claim 2 in which said polymer is cemented on the moldboard of the plow.

7. A plow as set forth in claim 2 in which said polymer is compounded with material such as glass fibers to increase its wear resistance.

References Cited in the file of this patent
UNITED STATES PATENTS

| | | |
|---|---|---|
| 1,058,248 | Martin et al. | Apr. 8, 1913 |
| 1,280,088 | Saltzer | Sept. 24, 1918 |
| 1,303,432 | Weisenborn | May 13, 1919 |
| 2,768,925 | Fay | Oct. 30, 1956 |
| 2,773,781 | Rodman | Dec. 11, 1956 |